United States Patent
Liechtenstein et al.

(10) Patent No.: US 11,847,092 B2
(45) Date of Patent: Dec. 19, 2023

(54) EXTRACTING SAP ARCHIVE DATA ON A NON-ORIGINAL SYSTEM

(71) Applicant: BUSINESS MOBILE AG, Kreuzlingen (CH)

(72) Inventors: Maximilian Ralph Peter von und zu Liechtenstein, Douglas (IM); Thomas Failer, Kreuzlingen (CH); Peter Rudolf Schoenenberger, Kreuzlingen (CH)

(73) Assignee: Business Mobile AG, Kreuzlingen (CH)

( * ) Notice: Subject to any disclaimer, the term of this patent is extended or adjusted under 35 U.S.C. 154(b) by 391 days.

(21) Appl. No.: 17/165,262

(22) Filed: Feb. 2, 2021

(65) Prior Publication Data
US 2022/0245089 A1    Aug. 4, 2022

(51) Int. Cl.
G06F 16/30    (2019.01)
G06F 16/11    (2019.01)
G06F 16/16    (2019.01)
G06F 9/455    (2018.01)

(52) U.S. Cl.
CPC ........ G06F 16/113 (2019.01); G06F 9/45558 (2013.01); G06F 16/162 (2019.01); G06F 16/166 (2019.01)

(58) Field of Classification Search
CPC .... G06F 16/113; G06F 16/162; G06F 16/166; G06F 9/45558
See application file for complete search history.

(56) References Cited

U.S. PATENT DOCUMENTS

| | | | | |
|---|---|---|---|---|
| 9,152,632 | B2 * | 10/2015 | Smith | G06F 16/152 |
| 2016/0019224 | A1 * | 1/2016 | Ahn | G06F 16/113 |
| | | | | 707/671 |
| 2020/0250046 | A1 * | 8/2020 | Wong | G06F 11/1471 |
| 2021/0019322 | A1 | 1/2021 | Liechtenstein | |
| 2021/0232460 | A1 * | 7/2021 | Kottomtharayil | G06F 11/1451 |

FOREIGN PATENT DOCUMENTS

| | | |
|---|---|---|
| EP | 3 128 445 | 2/2017 |
| EP | 3 343 402 | 7/2018 |

OTHER PUBLICATIONS

Book entitled "SAP on Azure Implementation Guide", by Morgan et al., Copyright 2020 (Year: 2020).*
European Search Report dated Jul. 15, 2021 for Application No. 21155846.5-1222.

* cited by examiner

*Primary Examiner* — Mahesh H Dwivedi
(74) *Attorney, Agent, or Firm* — Quisenberry Law PLLC (57) ABSTRACT

An apparatus, a method and a non-transitory computer readable medium are described herein related to extracting SAP archive data on a non-original system. In this way a user may extract business data from any ADK-format archive file in isolation, independent of the original system and without any accompanying metadata. A cloud-based on-demand distributed architecture with a plurality of virtualized SAP Netweaver Application Servers ABAP may speed up the extraction process from ADK-format files by an arbitrary order of magnitude.

8 Claims, 7 Drawing Sheets

EXTRACTING SAP ARCHIVE DATA ON A NON-ORIGINAL SYSTEM

BACKGROUND OF THE INVENTIONS

1. Field of the Inventions

The document relates to systems, devices, methods, and related computer program products for accessing archive data which has been written by an SAP system. More particularly, this patent specification relates to enhancements and modifications in relation to the SAP standard, that are useful in extracting archived data on a system other than the system of origin.

2. Description of the Related Art

Any discussion of the related art throughout the specification should in no way be considered as an admission that such related art is widely known or forms part of common general knowledge in the field. Unless otherwise indicated herein, the materials described in this section are not prior art to the claims in this application and are not admitted to be prior art by inclusion in this section.

Data Archiving removes mass data, which a system no longer needs, from the database, but which must still be available for reporting. For the most part, SAP's data archiving concept is based on the archiving objects of the SAP Archive Development Kit (ADK). Archiving objects describe the structure and context of the data to be archived. Predefined archiving objects are available for the applications for which data is to be archived. In data archiving, the system writes the data to archive files according to the relevant archiving objects and stores these. The SAP ADK framework uses a non-published proprietary data compression algorithm when storing archive data in ADK-format archive files. Furthermore, the format of ADK files is not an open format. When extracting SAP archive data from an ADK-file it is SAP's recommendation that SAP-standard archive extraction programs are used. These programs, however, rely on database tables which store information regarding the archive runs and the resultant archive files. As a result, it is not possible to extract ADK-format archive files on a system other than the original SAP system on which these ADK-format files were first produced.

Standard SAP-delivered functionality can be adapted to customers' needs through SAP's enhancement framework. There are certain ways to achieve the enhancements: Core Modification, User Exits, Customer Exits, BADI (Business Add Ins), Explicit Enhancements and Implicit Enhancements.

Third party providers have developed a business models around innovating around the SAP Standard in order to find new and useful ways of adapting the SAP-delivered product to customers' needs. Those third-party providers tend to market and sell their innovations as packages of Enhancements.

SUMMARY OF THE INVENTIONS

The current state of the art in SAP Netweaver related archiving revolves around moving old data into compressed files which are then stored in a file storage system. The main reason for moving data out the productive database and into a file-based system is that such database space is expensive and having too much old data in such a database inevitably slows down the performance of queries in the day to day operational side of the business. At the time the SAP ADK was conceived file-based storage of data was still many orders of magnitude more expensive than it is now. As a result, the SAP ADK framework relies heavily on data compression. However due to a proprietary compression algorithm being used, the resultant ADK-format files are effectively encrypted in the sense that no third-party tools exist which are capable of decompressing compressed data in ADK-format files. The SAP-supplied ADK file readers furthermore depend on the availability of an archive run database from the original SAP system, i.e., the system on which the ADK-format files were first written. The result is that for all practical purposes ADK-format files can only be extracted on the original SAP system with SAP-proprietary software. This approach has very significant disadvantages. In a scenario where the original SAP system has been retired and is no longer available, the archived data hence is no longer accessible. The only solution is to keep the original system operational for archive access reasons, even after retirement. Should, at some point in the future, SAP as a corporation no longer be in business then, in a worst case scenario, it may be impossible to set up an operational SAP system for archive data extraction.

The present inventors have realized that is desirable for ADK-format data to be readable in a system other than the original SAP system. It is especially desirable to be able to transform archived data to an open format, such as CSV which can be readily imported for data access and data search purposed into any common relational database.

In order to reach these goals, it is necessary to efficiently extract the data contained in ADK-format files. In a typical productive SAP system, however there are terabytes of archived data, which are all highly compressed. Because such SAP systems are normally still operational at the time of archive extraction, often only limited system resources may be diverted for the task of archive extraction, such as not to cause the operational functionality to become negatively affected. However, with such restrictions, the task of extracting the ADK-format files in the original SAP system becomes unduly time-consuming. It is not atypical that the task of extracting all of the retained ADK-format files in an operational SAP system of a large multi-national corporation may take many years, often 2-5 years.

The solutions found by the present inventors enable an extraction of ADK-files on any non-original SAP system. Moreover, no access to a database of archive runs is required. Hence the solution found by the present inventors is in principle a generic ADK-format file reader.

The present inventors have also solved the problem of unduly long processing times through an innovative cloud-based solution, by dividing the extraction task not only between multiple parallel work processes but also by using parallel non-connected SAP systems. Using this approach, it becomes possible to extract the full archive data of a large Fortune 500 corporation in a matter of minutes, a task which would normally take years when using SAP-standard technology.

There has thus been outlined, rather broadly, some of the features of the disclosed technique for extracting ADK-format archive data in order that the detailed description thereof may be better understood, and in order that the present contribution to the art may be better appreciated. There are additional features of the techniques that will be described hereinafter and that will form the subject matter of the claims appended hereto. In this respect, before explaining at least one embodiment of the techniques in detail, it is to be understood that the techniques are not limited in their application to the details of construction or to the arrangements of the components set forth in the following description or illustrated in the drawings. The techniques are capable of other embodiments and of being practiced and carried out in various ways. Also, it is to be understood that the phraseology and terminology employed herein are for the purpose of the description and should not be regarded as limiting.

Other features, aspects and advantages of the present inventions will become apparent from the following discussion and detailed description.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

The current state of the art in SAP Netweaver related archiving revolves around moving old data into compressed files which are then stored in a file storage system. The main reason for moving data out the productive database and into a file-based system is that such database space is expensive and having too much old data in such a database inevitably slows down the performance of queries in the day to day operational side of the business. At the time at which the SAP Archive Development Kit (ADK) was first conceived, file-based storage of data was still many orders of magnitude more expensive than it is today. Hence the ADK file format encompasses a high degree of data-compression.

However due to a proprietary and non-published compression algorithm being used, the resultant ADK-format files are effectively encrypted in the sense that no third-party tools exist which are capable of decompressing compressed data in ADK-format files. The SAP-supplied ADK file readers furthermore depend on the availability of an archive run database from the original SAP system, i.e., the system on which the ADK-format files were first written. The result is that for all practical purposes ADK-format files can only be extracted on the original SAP system with SAP-proprietary software. This approach has very significant disadvantages. In a scenario where the original SAP system has been retired and is no longer available, the archived data hence is no longer accessible. The only solution is to keep the original system operational for archive access reasons, even after retirement. Should SAP as a corporation no longer be in business at some point in the future then it may be impossible to set up a new operational SAP system for archive extraction. In such a worst-case scenario the archive data would permanently no longer be accessible, quite possibly despite legal obligations requiring continued retention of archive data.

The present inventors have realized that is desirable for ADK-format data to be readable in a system other than the original SAP system. It is especially desirable to be able to transform archived data to an open format, such as CSV which can be readily imported for data access and data search into any common relational database.

In order to reach these goals, it is necessary to efficiently extract the data contained in ADK-format files. In a typical productive SAP system, however there are terabytes of archived data which are all highly compressed. Because such SAP systems are normally still operational, only limited system resources may be diverted for the task of archive extraction, such as not to jeopardize operational performance during archive extraction. With such restrictions in place, the task of extracting the ADK-format files in the original SAP system becomes unduly time-consuming. It is not atypical that the task of extracting all of the retained ADK-format files in an operational SAP system of a large Fortune 500 corporation may take many years, often 2-5 years.

Figure 1:
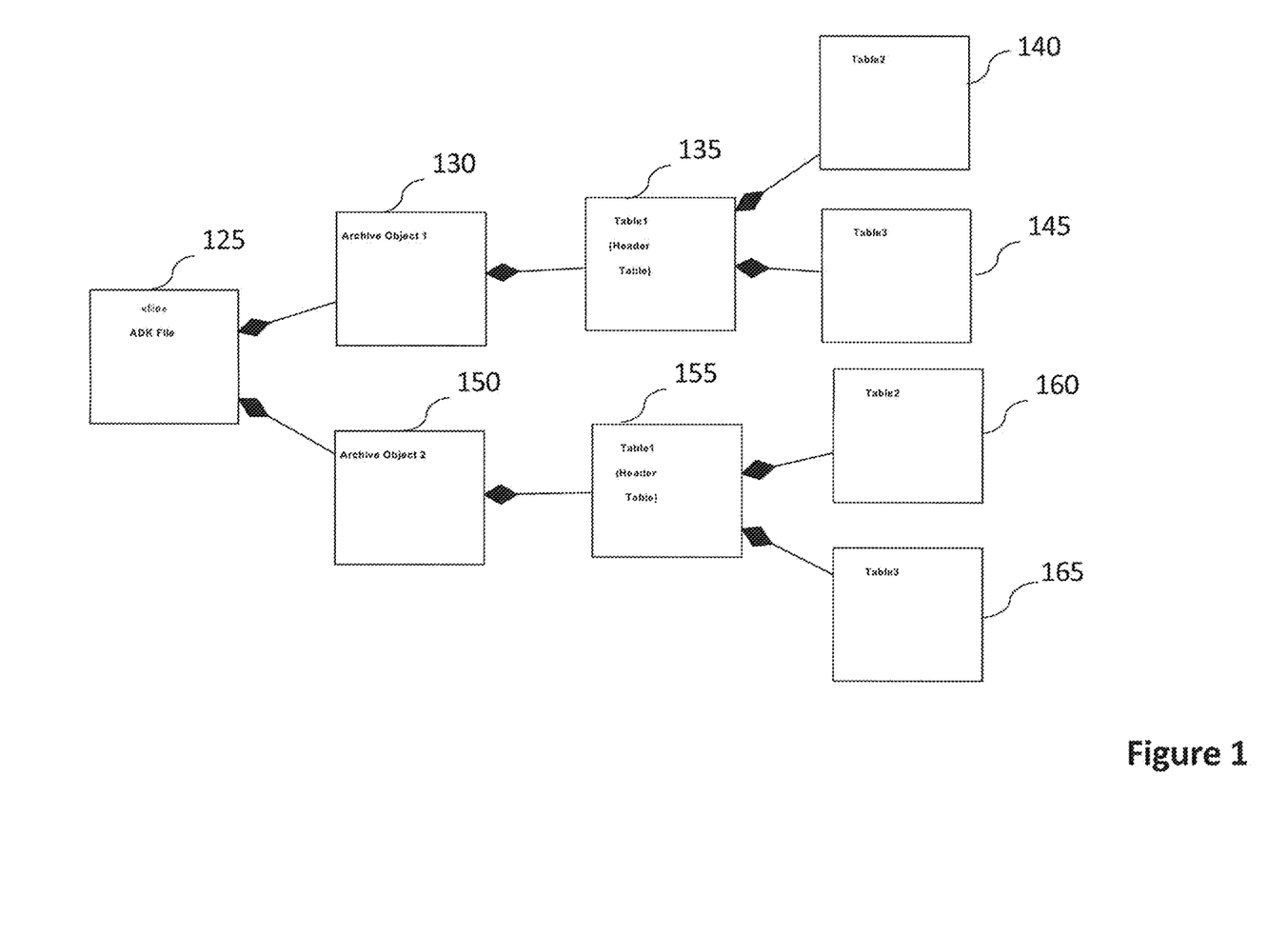
FIG. 1 is a UML object diagram which illustrates the content composition of an ADK-format archive file.

FIG. 1 is a UML object diagram which depicts the internal composition of an ADK-format archive file ADK-format file 125. The file comprises one or more archive objects, such as of Archive Object 1 130 and Archive Object 2 150. Archive Object 1 130 contains a single header row of table 1 135, and potentially several rows each of dependent tables 2 140 and 3 145. Similarly, in the depicted example, Archive Object 2 150 contains one row of header table 1 155 and potentially several rows each of tables 2 160 and 3 165. It is important to distinguish, in terms of terminology, between an Archiving Object and an archive object. Archiving Objects, as understood in the context of SAP Transaction SARA, are definitions of business objects in an archiving scenario. Archiving Objects can be linked to tables in the productive database by SAP-Transaction SARA. An example of an SAP-standard Archiving Object is FI_DOCUMNT, which is useful for archiving financial documents. Archiving Object FI_DOCUMNT is linked to several table, including tables BKPF and BSEG. The links can be viewed though SAP-Transaction DB15, which is accessible through SAP-Transaction SARA. The term archive object is defined herein as the main content of an ADK-format archive file, wherein an ADK-format file can store any number of archive objects.

Each ADK-format file relates to only one Archiving Object. As an example, when archiving financial accounting documents, normally the Archiving Object FI_DOCUMNT is selected in SAP-Transaction SARA. SAP-Transaction SARA then writes one or more ADK-format archive files, each of which contain one or more archive objects. An Archiving Object therefore is a definition of an archive object, where an ADK-format file may contain many archive objects, all of which associated with a single Archiving Object. An archive object normally contains one single row of a header table, such as one row from table BKPF in the FI_DOCUMNT example. An archive object furthermore normally contains one or more rows from one or more secondary tables. Every key in the index maps to an archive object on a one-to-one basis. An archive object comprises table rows from multiple tables of business data, where there are normally foreign key relationships between such tables of business data. The index itself does not contain all of the data of the archive object. An archive object is normally inserted into an ADK-format file stored on an external content server.

The solutions found by the present inventors enable an extraction of ADK-files on any non-original SAP system. Moreover, no access to a database of archive runs is required. Hence the solution found by the present inventors is in principle a generic ADK-format file reader.

Figure 2:
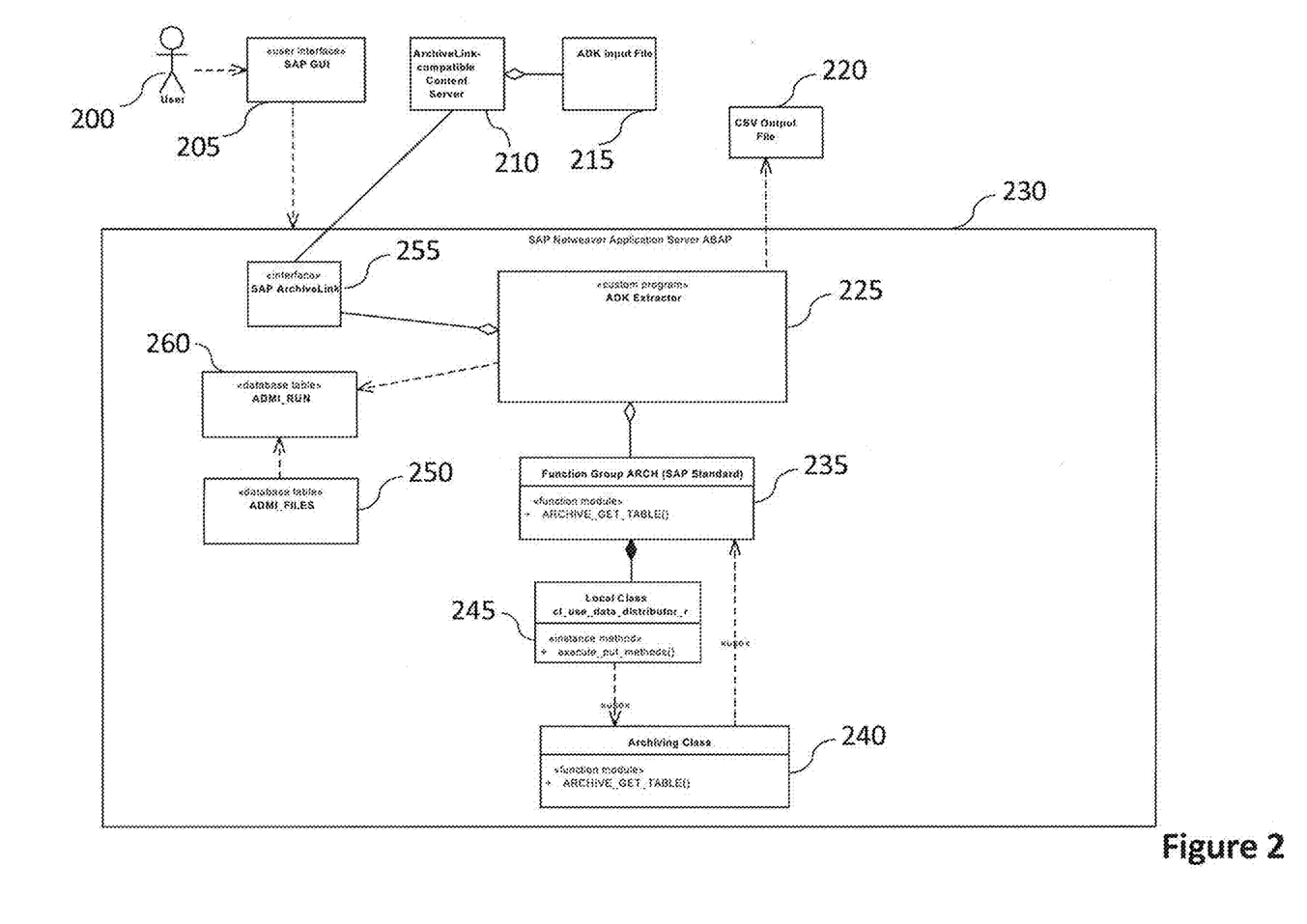
FIG. 2 is a UML system diagram which illustrates the architecture of a prior art ADK-format archive file data extraction system.

FIG. 2 is a UML diagram which depicts a prior art solution of extracting ADK-format archive data. A user 200 may connect to an SAP Netweaver Application Server ABAP 230 through an SAP GUI type client 205. It is possible to connect to an SAP application server 230 in various other ways, but SAP GUI 205 is the most common way. The user 200 may then start a custom program, which in SAP terminology is commonly called a report, which takes an archive run as input and outputs the data which is associated with the archive run as a comma-separated file (CSV file) 220. The archive runs are stored in database table ADMI_RUN 260. The ADMI_RUN table 260 is linked to dependent table ADMI_FILES 250 by a foreign key relationship. The ADMI_FILES table 250 lists the file names and file locations for each ADK-format archive file 215 which has been produced by an earlier archive run. The files which are referenced in table ADMI_FILES 250 are commonly stored in an SAP ArchiveLink-compatible content server 210. ArchiveLink is a service integrated in the SAP Web Application Server 230 for linking archived documents and the application documents entered in the SAP system. The ADK-format archive files are hence referenced in the ADMI_FILES table 250 and subsequently retrieved via an ArchiveLink compatible interface 255, wherein the interface accesses the content server 210, which in turn is able to access the physical storage location of the ADK-format input file 220. The ADK file extraction process is then typically controlled from a custom ABAP program 225. Such a program typically makes use of the SAP-standard function library ARCH 235. This function library, also known as a function group in SAP terminology, is the central entry point for any task that reads from archive documents. The function group comprises a number of functions (referred to as function modules in SAP terminology), the most important ones are ARCHIVE_GET_RECORD, which reads a single record from the ADK-format file and ARCHIVE_GET_TABLE, which reads a table-type data structure which is encapsulated in a record. Analogous to FIG. 1 a record comprises a single row from a header table and an arbitrary number of table rows from an arbitrary number of dependent tables. Hence once a record has been acquired with the function module ARCHIVE_GET_RECORD, it then becomes possible to read in the table data contained therein with function module ARCHIVE_GET_TABLE. This function module has the table name as one of its input parameters and it returns a table structure with the table records. The table records can then be iterated through and with each iteration a row in the comma-separated output file 220 can be written. Archiving classes 240 can be included in archiving object to consistently archive and access data that belongs together from technical and application point of view. Archiving classes are essentially function libraries consisting of function modules with a standard interface. For example, the archiving object MM_EKKO (for purchase orders) contains archiving class P_ORDER and potentially any number of additional archiving classes. All archiving classes have a GET_TABLE method. In the example of archiving object MM_EKKO, the archiving class P_ORDER has function module P_ORDER_ARCHIVE_GET_TABLE, which contains the program logic for retrieving purchase order data from an ADK-format file. Importantly the archiving classes may themselves call function modules in function group ARCH. Hence it is important to note that the archiving classes are invoked from function group ARCH whilst the GET_TABLE-type function modules of the archiving class in turn invoke function modules of function group ARCH. This kind of circular reference is illustrated by function group ARCH 235 making a call to method execute_put_methods of local class cl_use_data_distributor_r 245. The method invokes an archiving class 240 which in turn invokes function group ARCH 235.

Figure 3:
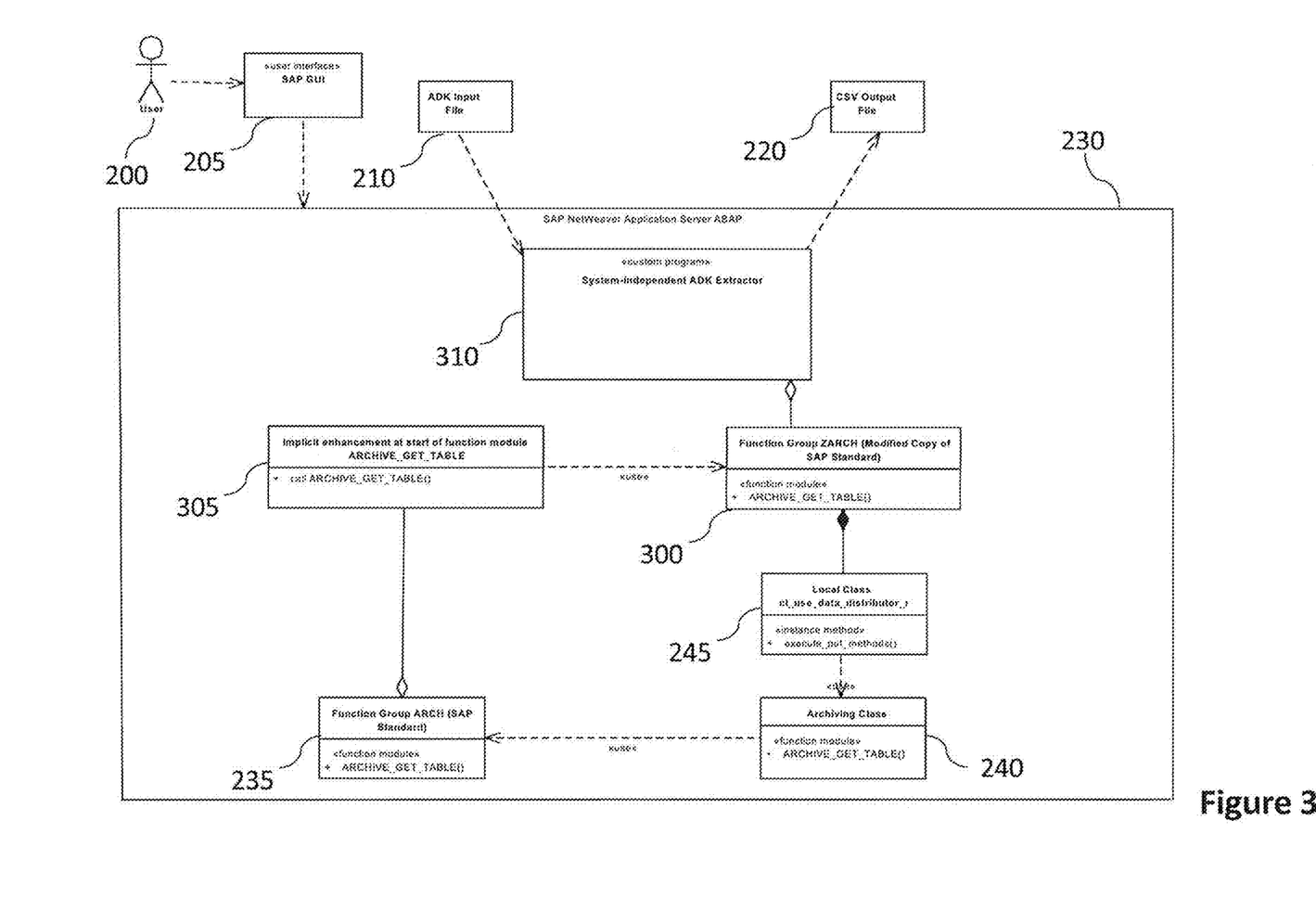
FIG. 3 is a UML system diagram which illustrates the architecture of a system-independent generic ADK-format archive file data extraction system, according to an example embodiment.

FIG. 3 depicts an example embodiment of the instant inventions wherein a system-independent ADK-format archive file extraction program 310 is being used. Such a program may take any ADK-format file 210 as input, regardless of the system of origin. Since the SAP-standard function group ARCH does not support reading in ADK-format files from other systems, the present inventors have copied the function group ARCH 235 to a custom function group ZARCH 300 in the customer namespace. This approach constitutes a preferred embodiment. However, it is not necessary to copy function group ARCH 235. It is also possible to create a new object which fulfills the same program logic. For example, it is possible to use an object-oriented approach and implement the required functionality as an ABAP class instead of a function group. It is also possible to use SAP's enhancement framework and inject new logic into the existing implementation of function group ARCH 235. Moreover, it is possible to change function module ARCH by means of modification. There is one problem, however, which makes changing the function module ARCH particularly challenging. This is due to the fact that the function group ARCH 235 is stateful, in the sense that it carries instance data, i.e., in the TOP-INCLUDE which is commonly used in ABAP programs to carry instance data. This problem is compounded when archiving classes are being used. Archiving classes should not be changed due to the fact that they are standard objects, which are dynamically called dependent on the customizing in the system of origin. Furthermore, there is no finite list of archiving classes since new archiving classes can be added to a system at any time. Hence it is important that the ADK-format extractor program 310 stays compatible with any SAP-standard archiving classes. The standard archiving classes have no knowledge that a custom function group ZARCH 300 exists and therefore any calls to function group ARCH 235 are not relayed to function group ZARCH 300. In the absence of a re-direction, the standard processing is unable to function. This is because before the archiving class which is called by the custom function group ZARCH 300 is populated with instance data in the TOP-INCLUDE. It is this instance data that is required when the archiving class makes callbacks back to function module ARCH. The present inventors have realized that it is advantageous to insert an implicit enhancement at the start of function module ARCHIVE_GET_TABLE. The purpose of this enhancement is to check whether the caller of the archiving class was custom function group ZARCH 300, as opposed to standard function group ARCH 235. If that is the case, then the callback is being redirected to custom function group ZARCH 300, where all the required instance data is available. The present inventors have solved the problem of how to signal which function group has made the call to the archive class by re-purposing the input parameter ARCHIVE_HANDLE of function module ARCHIVE_GET_TABLE. Normally, that is to say in the SAP standard, the input parameter ARCHIVE_HANDLE can never take a negative value. In the SAP standard the parameter is either 0 when it is initial or an integer of 1 or greater when it is not initial. The present inventors have solved the problem of signaling the caller by encoding the ARCHIVE_HANDLE parameter with a negative integer whenever the caller of the archiving class is not the standard function group but the custom function group. Those skilled in the art will realize that alternative ways of enabling the required signaling are possible, such as using ABAP-Memory or an ABAP GET/SET Parameter for example. The advantage of re-purposing the ARCHIVE_HANDLE parameter, however, is that the existing interface to between function group and archiving class can be retained without any modification or enhancement.

Figure 4:
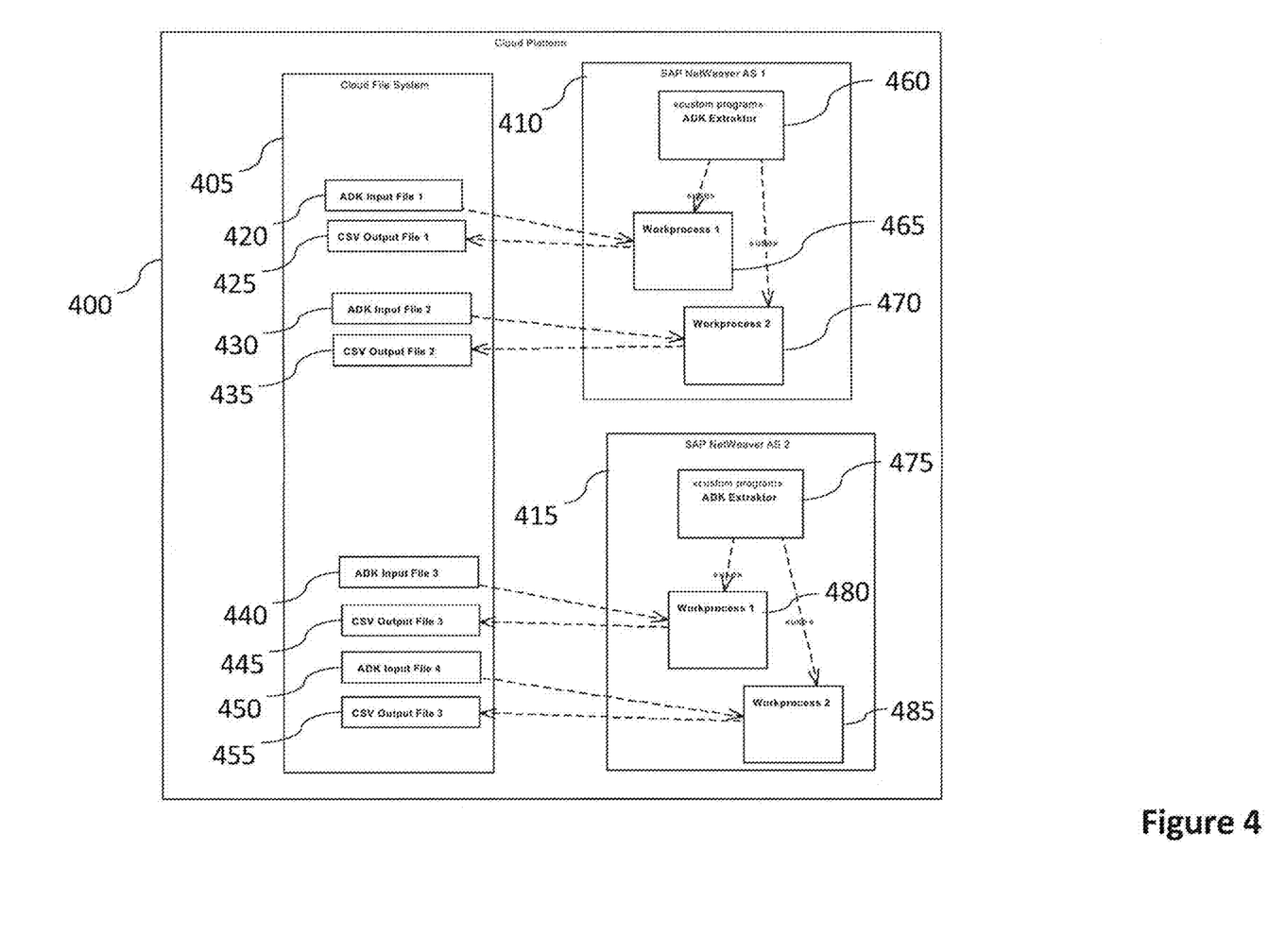
FIG. 4 is a UML system diagram which illustrates the architecture of a distributed ADK-format archive file data extraction system with parallel processing, according to an example embodiment.

FIG. 4 is a UML diagram which depicts an example embodiment of a specific embodiment of a novel system-independent ADK-format data extraction technique being for use in a distributed and parallel processing architecture. The present inventors have solved the problem of unduly long processing times by devising innovative cloud-based solutions, by dividing the extraction task not only between multiple parallel work processes but also by using parallel non-connected SAP systems. Using this approach, it becomes possible to extract the full archive data of a large Fortune 500 corporation, often hundreds of terabytes in size, in a matter of minutes, i.e., a task which would normally take many years when using SAP-standard technology. SAP-standard technology, in the context of the SAP NetWeaver Application Server ABAP, does offer certain ways of speeding up lengthy processes by using parallel processing. The current state of the art allows to split a lengthy task into a series of packets and then process each of these packets with a different work process. Often the work processes have a dedicated processor assigned to them. So, it would be standard practice, when at least 20 processors are available, to split the task at hand into 20 packets, assign a work process to each packet and then have a separate processor process each work process in parallel. The current state of the art, however, meets its limitations when hundreds of terabytes of archive data have to be extracted from ADK-format archive files. The reason for this limitation lies in the restriction that on an SAP Netweaver Application Server ABAP the maximum number of work processes is limited. An SAP system, in turn, may comprise any number of application servers, which all access the same database, and which may be set up for load balancing. Using this architecture, the number of work processes is, in principle, unlimited. However, this architecture also exhibits severe disadvantages. On the one hand it is very difficult to set up multiple SAP NetWeaver application servers and interconnect them with load-balancing. Also, oftentimes the licensing costs are prohibitive. Normally multiple application servers with load balancing are only used on the production environment of large multi-national corporations, where the system loads are permanently large enough to warrant setting up such a complex architecture. For one-off ADK-file data extraction the scenario is oftentimes fundamentally different. Such tasks are often one-time tasks, where such an extraction is needed sometimes without notice, but within a short timeframe. A typical use case would be a tax inspection or audit, wherein the tax inspector or auditor demands instant access to archived documents. Such archived documents then need to be viewable in a matter of weeks at most. This is insufficient time to extract terabytes of archive data on a single application server and it normally is also insufficient time to set up a complicated new architecture with multiple inter-connected application servers on load balancing. Moreover, such an architecture requires licensing from SAP and obtaining such licenses can be expensive and time-consuming. Even if a multi-national corporation already has a plurality of load-balanced application servers in the production environment, then the capacity limit is most often already reached and there is no spare capacity for any additional extremely resource-intense processing tasks. Hence the present inventors have realized that the optimal solution to the problem at hand is a cloud-based distributed architecture which can be immediately scaled up or down many orders of magnitude on an ad-hoc basis without notice. Such a cloud-based architecture may be hosted with any common cloud services provider who is capable of hosting virtual machines which are capable of running a virtual machine which comprises an SAP application server. An exemplary embodiment of the present inventions uses the Microsoft Azure Platform 400 to host one or more Netweaver Application Servers ABAP 410 and 415 as part of an architecture that has one application server per SAP system per virtual machine. In a preferred embodiment a MiniSAP SAP system is installed on a Linux virtual machine. MiniSAP is a scaled down version of the Netweaver Application Server which can be used as a suitable ABAP runtime environment when the objective is not to store business data on a database, but to run stand-alone and database-independent ABAP programs, such as the ADK-file extractor 460. In a preferred embodiment the MiniSAP-based application server is hosted in a Linux system which in turn is virtualized on an Azure Windows virtual machine with VMWare Workstation Pro. Those skilled in the art will realize that many other alternatives for setting up an SAP Netweaver Application Server ABAP on a virtual machine in a cloud-based environment are possible. An important aspect when setting up such scalable on-demand architecture is that it is possible to run an arbitrary number of copies of the master copy of the virtual machine with the application server. The master copy is already operational, in the sense that it starts scanning for unprocessed ADK-format input files in the import directory as soon as it is instantiated. It does not need configuration or activating after instantiation. Therefore as soon as a virtual machine copy of the master copy is instantiated it is already fully operational. This means that if originally just the master copy of the virtual machine is processing ADK-format input files, then it is possible to improve the extraction performance tenfold by simply copying the master copy ten times and instantiating the respective virtual machines, provided of course that the hosting cloud platform is configured to supply an appropriate number of processors and memory for a ten-fold increase. There is no upper limit to scalability. If an operator should wish to increase performance by a factor of one million, for example, then that performance level can be reached on an ad-hoc basis, simply by copying the master copy one million times and selecting an appropriate increase of computation resources on the cloud platform. Therefore, it is important that the cloud platform allows to dynamically allocate processor and memory resources to the collection of virtual machines. Moreover, it is important that the virtual machines have access to a shared file system. It is not necessary that the application server have any knowledge of the existence of the other application servers. Hence an advantage is that the ADK-file extraction performance can be scaled up by just copying the master virtual machine as many times as is necessary. In particular, it is not necessary to use an SAP message server in order to let application servers communicate with each other and it is not necessary to configure SAP's load-balancing frameworks. Once the extraction task is complete then it is just as straightforward to instantly disable the system, since the extraneous virtual machines can simply be destroyed when they are no longer required.

In an example embodiment as shown in FIG. 4, the Azure file system 405 may comprise an arbitrary number of ADK-format input files 420 430 440 450 waiting to be extracted. An arbitrary number of extraction programs, such as 460 and 475 each run an arbitrary number of work processes, such as 465, 470, 480 and 485. Each work process is continually scanning the shared file system in order to look for unprocessed input files. Once a work process has taken ownership of an input file it needs to be marked, so that the same file will not be picked up by other work processes. Since the application servers 410 and 415 are not interconnected, it is only possible to mark an input file as being owned by a work process in two ways. One such way is to rename the file, wherein the new name then reflects that the file has an owner. A particularly advantageous way to rename an input file, so that ownership is indicated, is by either prefixing or suffixing the file with a string constant that indicates an owned file. For example, the input file name "a.adk" may be changed to "_a.adk", wherein the "_" sign indicates that the file in question is already being owned. Another way of indicating file ownership is by moving the file into another directory. Once the file has been moved from the original directory, which is being scanned by the other work processes, it is no longer subject to being picked up by any of the other currently active work processes. Once a work process has finished extracting the archive data from the ADK-format file, it may write the extracted data to an output file which is suitable for further processing, such as serving as an input file for entry into a relational database. In a preferred embodiment such output files 425, 435, 445 and 455 are of CSV-format (comma separated format). Other common formats such as XML or SGML may serve the same purpose.

Figure 5:
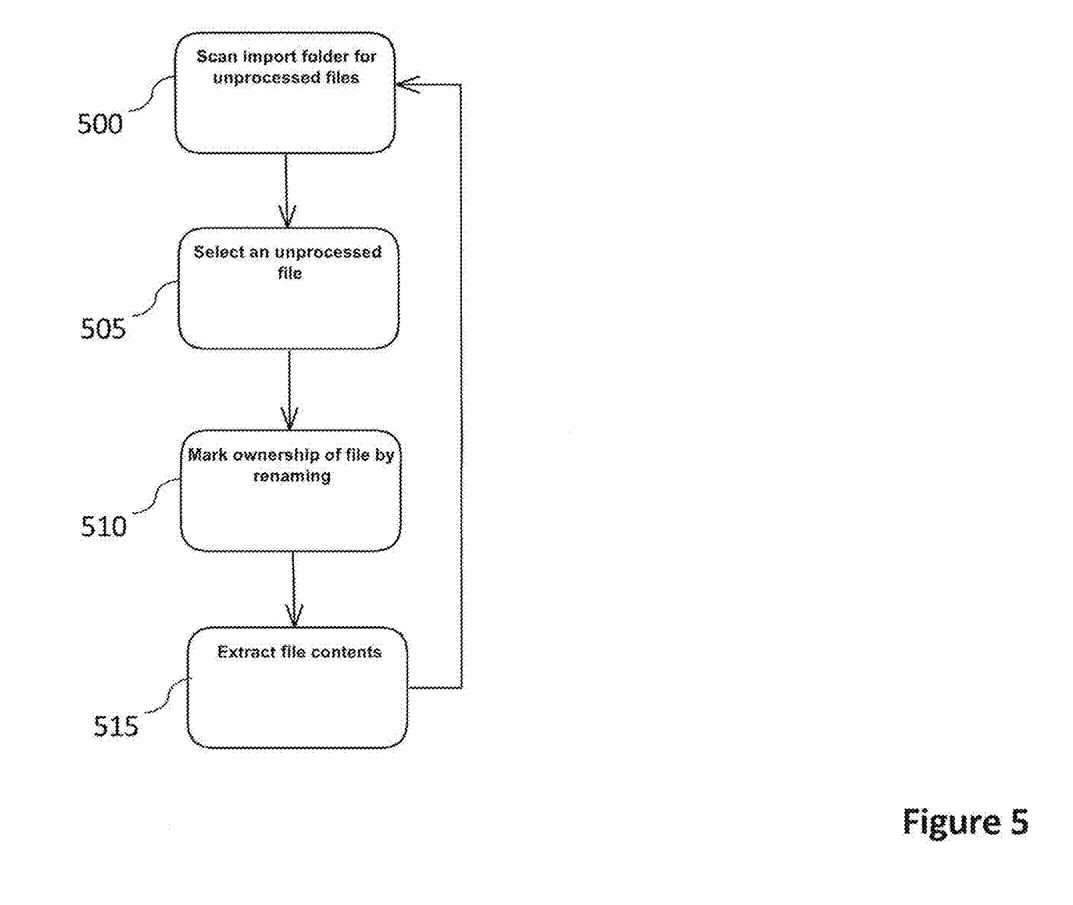
FIG. 5 is a flow diagram which illustrates the processing steps for file acquisition in a distributed ADK-format archive file data extraction system with parallel processing, according to an example embodiment.

FIG. 5 is a block diagram which depicts a specific embodiment of how the various work processes may select new files for processing. As a first step 500 the import folder may be scanned for unprocessed files. An unprocessed file may be identified, for example, by having a certain pattern in the file name which indicates an unprocessed file. Alternatively, unprocessed files may be stored in a special directory which only contains unprocessed files. As a second step 505 an unprocessed file may be selected and then immediately renamed 510 such as to mark ownership. Only if and when the completion of the renaming has been confirmed, may file processing 515 be started, whereby the archive data of the ADK-format file is being extracted. Once complete, then the process reverts to the first step 500 again, such as to scan for more input files.

Figure 6:
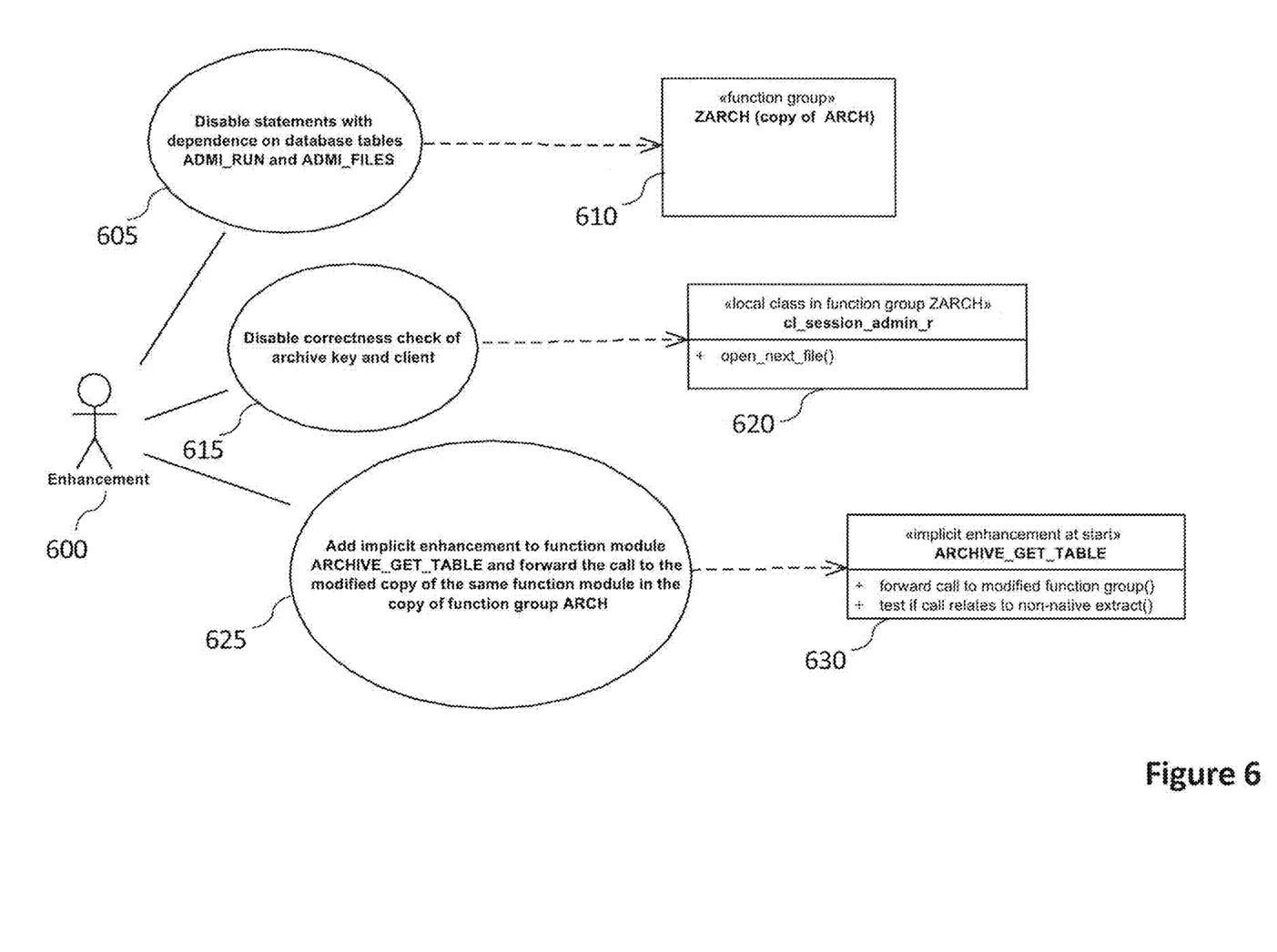
FIG. 6 is a UML diagram which illustrates a number of steps for changing an SAP-original system in order to allow system-independent ADK-format file archive data extraction, according to an example embodiment.

FIG. 6 is a diagram which details steps which need to be performed by an actor 600 in order to enable SAP-standard function group ARCH for system-independent extraction of ADK-format files. In a preferred embodiment function group ARCH 235 is copied into the customer namespace under the name ZARCH 610 or any other suitable name for the customer namespace. Inside the copy of function group ARCH 235 all statements which reference database tables in package SARC, such as tables ADMI_RUN or ADMI_FILES, need to be disabled 605. This may be achieved, for example, by commenting out or deleting the respective statements. It is also possible to insert conditional statements, such as IF-ELSE blocks for example, into the code base which have the effect of skipping the calls to any database tables in package SARC. Another important step is to disable the correctness check of archive key and client 615. Such checks are performed by the SAP-standard implementation of function group ARCH in order to ascertain that only system-native ADK-format files can be processed. One location which contains such a check in need of disablement is in local class CL_SESSION_ADMIN_R, which is encapsulated in function group ARCH, or in the copy in the customer namespace respectively. In particular, such a check is executed in method OPEN_NEXT_FILE( ) 620. In order for the plurality of SAP-standard archiving classes to remain operational, it is furthermore indicated to add an implicit enhancement to the start of function module ARCHIVE_GET_TABLE and to forward the call to the modified copy of the function group ARCH. In particular the call needs to be forwarded to the equivalent function module in the copied function module 625. The enhancement needs to test if the call relates to an ADK-format file which is not native to the system and if so, then it needs to forward the call to the modified copy of the standard function group and exit thereafter 630.

Figure 7:
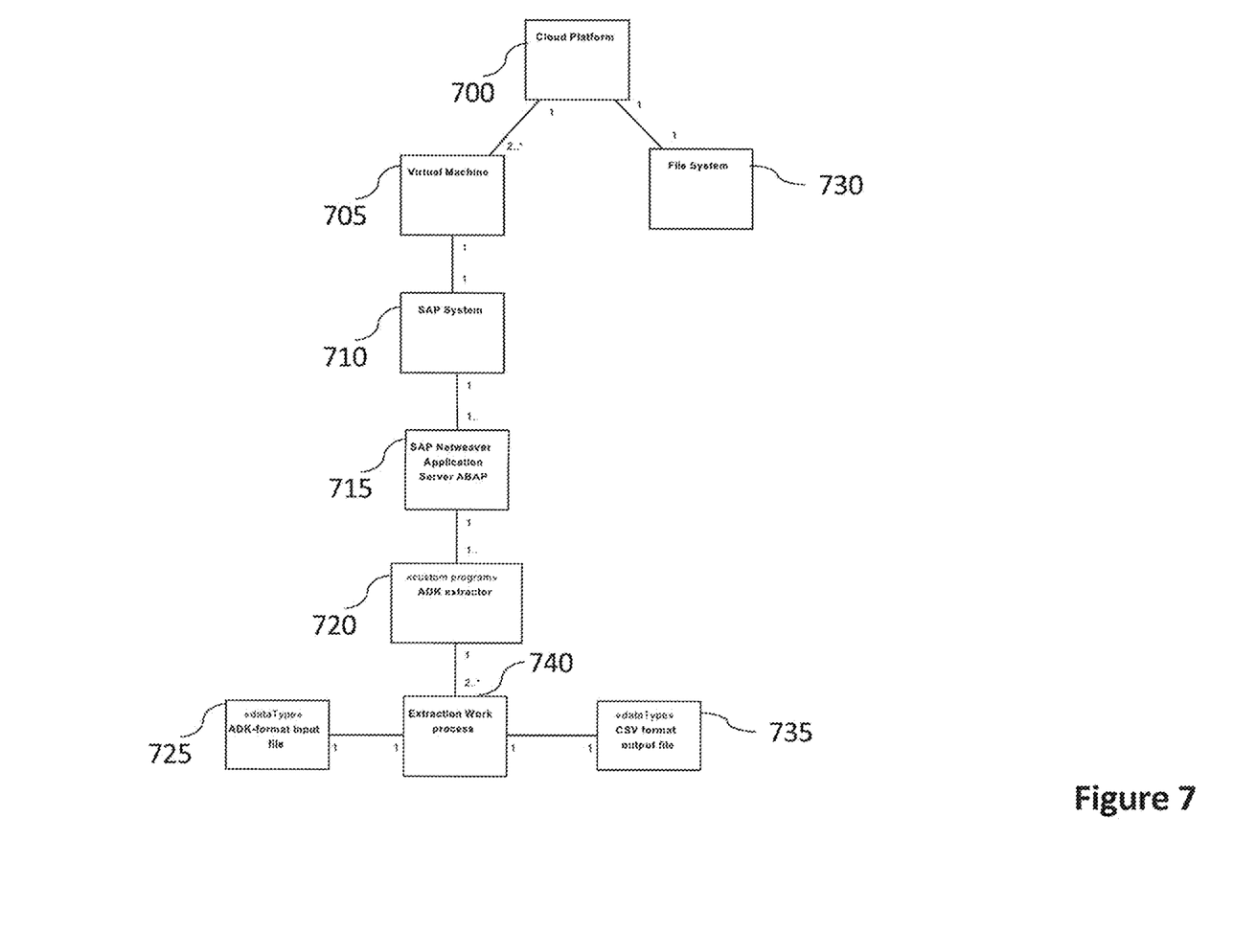
FIG. 7 is a UML class diagram which illustrates the associations and the multiplicity between the components of an ADK-format extraction system, according to an example embodiment.

FIG. 7 is a UML class diagram which illustrates the multiplicity between the system components, according to an example embodiment. A cloud platform 700 is at the root of the diagram. In a preferred embodiment Microsoft Azure is used. Microsoft Azure offers two deployment models for cloud resources: the "classic" deployment model and the Azure Resource Manager. In the classic model, each Azure resource (virtual machine, SQL database, etc.) is managed individually. The Azure Resource Manager enables users to create groups of related services so that closely coupled resources can be deployed, managed, and monitored together. In a preferred embodiment a plurality of virtual machines 705 and one shared file system 730 is deployed via the Azure Resource Manager. The preferred embodiment furthermore deploys one SAP system 710 per virtual machine. The preferred embodiment furthermore comprises one SAP Netweaver Application Server ABAP 715 per SAP system. Each of said application servers 715 comprises at least one custom ADK-file extractor program 720. Each extractor program 720 comprises at least one extraction work process 740. In a preferred embodiment a plurality of work processes 740 is used. Generally, at least one work process 740 can be used per available processor in the virtual machine. Therefore, in a preferred embodiment the number of work processes 740 is no less than the number of available processors, provided that at least that number of ADK-format input files need processing. Each work process 740 is associated with exactly one input file 725 in a preferred embodiment. Likewise, each work process 740 is associated with one output file 735 in a preferred embodiment, however the inventions may also be practiced with a plurality of output files per work process.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the diagrams, scenarios, and flow charts in the figures and as discussed herein, each block and/or communication can represent a processing of information and/or a transmission of information in accordance with example embodiments. Alternative embodiments are included within the scope of these example embodiments. In these alternative embodiments, for example, functions described as blocks, transmissions, communications, requests, responses, and/or messages can be executed out of order from that shown or discussed, including substantially concurrent or in reverse order, depending on the functionality involved. Further, more or fewer blocks and/or functions can be used with any of the diagrams, scenarios, and flow charts discussed herein, and these diagrams, scenarios, and flow charts can be combined with one another, in part or in whole.

A block that represents a processing of information can correspond to circuitry that can be configured to perform the specific logical functions of a herein-described method or technique. Alternatively or additionally, a block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk or hard drive or other storage medium.

The computer readable medium can also include non-transitory computer readable media such as computer-readable media that stores data for short periods of time like register memory, processor cache, and random access memory (RAM). The computer readable media can also include non-transitory computer readable media that stores program code and/or data for longer periods of time, such as secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Definitions and Clarifications:

Herein below are a few definitions and clarifications. As used herein:

The terms "a" and "an", when modifying a noun, do not imply that only one of the noun exists.

The term "comprise" (and grammatical variations thereof) shall be construed broadly, as if followed by "Without limitation". If A comprises B, then A includes B and may include other things.

The term "e. g." means including without limitation. The fact that an "example" or multiple examples of something are given does not imply that they are the only instances of that thing. An example (or a group of examples) is merely a non-exhaustive and non-limiting illustration.

The term "include" (and grammatical variations thereof) shall be construed broadly, as if followed by "Without limitation".

The term "or" is an inclusive disjunctive. For example "A or B" is true if A is true, or B is true, or both A or B are true.

A parenthesis is simply to make text easier to read, by indicating a grouping of words. A parenthesis does not mean that the parenthetical material is optional or can be ignored

The invention claimed is:

1. A method for extracting encoded archive files, the method comprising:
   transferring an encoded archive file to a file system, wherein said file system is configured to allow shared file access to one or more virtual machines, wherein each of said virtual machines is hosting at least one extraction system and wherein said encoded archive file has a system of origin different to said extraction system,
   marking ownership of said archive file, wherein said marking causes said archive file to be available to exactly one extraction system,
   decoding said archive file, wherein said decoding comprises extracting data, wherein said data comprises one or more interlinked tables,
   enriching said data with one or more routines, wherein said routines are comprised in an archiving class and wherein said archiving class comprises routines for processing said interlinked tables, and
   signaling said archiving class, wherein said signaling causes a conditional redirection of a callback of said archiving class to one of a plurality of libraries, wherein each of said libraries comprises a method for processing one of said interlinked tables.

2. The method of claim 1 wherein said signaling comprises a negative integer for a file handle for signaling a first redirection and a non-negative integer for said file handle for signaling a second redirection.

3. The method of claim 1 wherein said marking is accomplished by renaming said file.

4. The method of claim 1 wherein said marking is accomplished by moving said file to a different directory in the file system.

5. The method of claim 1 wherein said marking is accomplished by deleting said file.

6. An apparatus for extracting archive data, the apparatus comprising:
   an original computing system, wherein said system is original in such a way that said archive data originates from said original system, and
   a cloud platform, wherein said cloud platform is capable of instantiating a plurality of virtual machines and a file system and wherein said file system is capable of being accessed by the plurality of virtual machines and wherein a virtual machine is capable of virtualizing a non-original computing system, wherein said system comprises one or more extraction programs, wherein an extraction program is capable of instantiating a plurality of extraction work processes and wherein an extraction work process takes as input an encoded archive file and wherein an extraction process writes as output a decoded archive file, wherein said encoded archive file is available to exactly one extraction program, wherein said decoded archive file comprises one or more interlinked tables, wherein said encoded archive file comprises at least one archiving object, wherein said archiving object comprises at least one archiving class, wherein the archiving class is configured to make a callback to a library, wherein said library at a time when said callback is made is stateless in such way that said library does not comprise instance data relating to the archiving object and wherein said library is comprised in both said original system and said non-original system.

7. The apparatus of claim 6, wherein said library is configured in such a way that it causes a redirect of said callback to a stateful library, wherein said stateful library is stateful in such a way that it comprises instance data relating to the archiving object.

8. The apparatus of claim 6, wherein said library is configured to cause said redirect conditional on a numeric input parameter for a file handle of said archive file being assigned a negative value.

\* \* \* \* \*